Nov. 2, 1937.                    F. LANG                    2,097,492
                               FUEL FEED MEANS
                             Filed Sept. 6, 1935
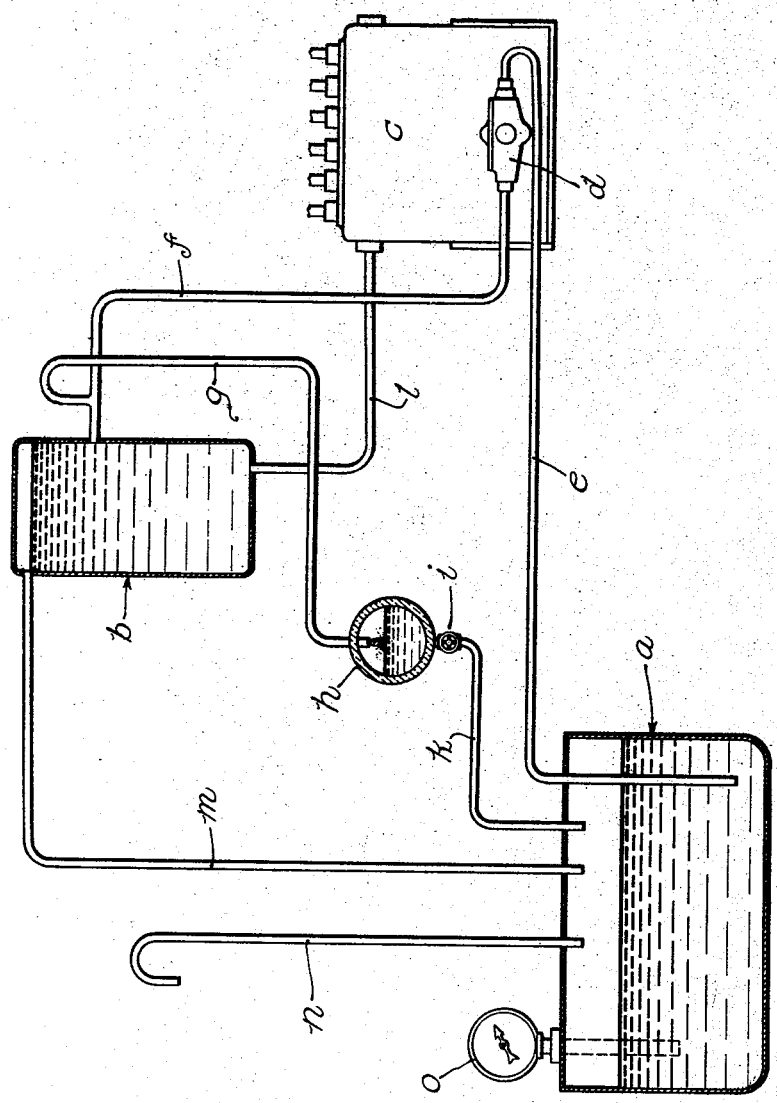
Inventor.
Franz Lang
By: Brown, Jackson, Boettcher & Dienner,
Attys.

Patented Nov. 2, 1937

2,097,492

UNITED STATES PATENT OFFICE 2,097,492

FUEL FEED MEANS

Franz Lang, Munich, Germany, assignor, by mesne assignments, to Lanova Corporation, New York, N. Y., a corporation of Delaware Application September 6, 1935, Serial No. 39,427
In Germany September 8, 1934

4 Claims. (Cl. 158—36.4)

The present invention relates to a means for controlling and regulating the feeding of fuel to automobile engines, especially an injection or Diesel engine having a fuel feeding pump.

It is an object to deliver the fuel taken from a main tank into an auxiliary tank, by means of the feed pump, from which auxiliary tank the fuel is delivered to the fuel injecting pump unit, the surplus fuel being returned to the main tank in part from the supply pipe from the feed pump, from a point in this pipe in advance of the auxiliary tank, and in part from the auxiliary tank itself, by means of separate pipes or conduits.

The connection of the supply pipe to the auxiliary tank is positioned lower than the connection to this tank of the fuel overflow return pipe leading to the main tank. The connecting point of the supply pipe to the auxiliary tank may be provided at different heights or may be adjustable in height.

The highest point of the fuel overflow return pipe, leading from the supply pipe, is positioned below the point of connection of the auxiliary tank return pipe to the auxiliary tank.

An inspection glass, visible to the operator, is suitably mounted upon the instrument board for the observation of the flow of fuel, and is inserted in the fuel return pipe leading from the supply pipe.

A valve or the like is inserted in the return pipe leading from the observation glass or the like to the main tank, for maintaining a predetermined fuel level in the observation glass, or for making visible the flow of the fuel into the latter, respectively.

The single figure of the drawing is a semi-diagrammatic view of a preferred embodiment of my invention.

The main tank is designated $a$, the auxiliary tank $b$, the injection pump unit $c$ and the feeder pump $d$. The feeder pump intake pipe $e$ leads from the main tank $a$ to the feeder pump $d$, and the supply pipe $f$ leads from the discharge side of pump $d$ to the auxiliary tank $b$. The fuel return pipe $g$ leads from the pipe $f$, from a point thereof in advance of the auxiliary tank $b$, to the gauge or observation glass $h$. From the gauge glass, the fuel flows through a valve $i$, or the like, and through a pipe $k$ back into the main tank $a$. The auxiliary tank $b$ communicates with the injection pump unit $c$ by way of feed pipe $l$, and with the main tank $a$ by way of fuel overflow return pipe $m$, the connection of this latter pipe to tank $b$ being at a point above the highest point of pipe $g$. The tank $a$ is provided, in the usual manner, with a vent pipe $n$ and may be provided with a tank meter $o$, or the like, for indicating the amount of fuel in the main tank.

The operation of the arrangement is as follows: The feeder pump $d$ constantly delivers fuel from the main tank $a$ to the auxiliary tank $b$, through pipes $e$ and $f$. The fuel necessary for operation flows through pipe $l$ to the injection pump unit $c$. The surplus fuel delivered to the auxiliary tank $b$ constantly flows back to the main tank through pipe $g$, gauge $h$, valve $i$ and pipe $k$. If the delivered surplus fuel exceeds the amount flowing off through the pipes $g$ and $h$, regulated by valve $i$, the additional surplus fuel is returned to the main tank $a$ by way of pipe $m$. Therefore, whenever the gauge is full, the functioning of the feeder pump can be constantly controlled. If it is desired to check as to the fuel flow, the fuel level may be lowered in the gauge by suitably adjusting the valve $i$, which permits the observation of the fuel inflow into the gauge, as indicated in the drawing.

Whenever the fuel feed pump stops functioning, it is immediately apparent from the lack of flow of fuel into the gauge. The same is true when the main tank is empty. In this latter case, the auxiliary tank still contains sufficient fuel to keep the vehicle going until it is possible to refill the main tank. Providing a meter for the main tank facilitates location of defects in the line, or line trouble whenever the fuel supply fails with an adequate supply of fuel remaining in the main tank. By means of a variable, or adjustable connection of the supply pipe from the feeder pump to the auxiliary tank, the amount of reserve fuel to be carried in the latter can be regulated.

What I claim is:—

1. In combination in fuel feed means, a main fuel tank, an injection pump, an auxiliary fuel tank above said main tank and said pump and connected to the latter, a feed pump withdrawing fuel from said main tank and connected to said auxiliary tank for supplying fuel thereto above the connection between said auxiliary tank and said injection pump, a fuel return pipe leading from the supply line of the auxiliary tank to the main tank, visual fuel flow indicating means in said return pipe, means for regulating flow of fuel through the return pipe, and a fuel return pipe leading from said auxiliary tank to said main tank and connected to said auxiliary tank above the connection between the latter tank and said fuel supply line.

2. In combination in fuel feed means, a main fuel tank, an injection pump, an auxiliary fuel tank above said main tank and said pump and connected to the latter, a feed pump having its intake connected to said main tank for withdrawing fuel therefrom, a supply pipe connected to the discharge of said feed pump and to said auxiliary tank for delivering fuel to the latter above the connection between said auxiliary tank and said injection pump, a first fuel return pipe leading from said supply pipe to said main tank, means for regulating flow of fuel through said return pipe, and a second fuel return pipe connected to said auxiliary tank above the connection between the latter tank and said supply pipe, said second fuel return pipe being connected to said main tank for return thereto of surplus fuel.

3. In combination in fuel feed means, a main fuel tank, an injection pump, an auxiliary fuel tank above said main tank and said pump and connected to the latter, a feed pump having its intake connected to said main tank for withdrawing fuel therefrom, a supply pipe connected to the discharge of said feed pump and to said auxiliary tank for delivering fuel to the latter above the connection between said auxiliary tank and said injection pump, a first fuel return pipe connected to said supply pipe extending upward to a point above said supply pipe and thence to said main tank, visual fuel flow indicating means in said return pipe, and a second fuel return pipe connected to said auxiliary tank above the connection between the latter tank and said supply pipe and above the highest point of said first fuel return pipe, said second fuel return pipe being connected to said main tank for return thereto of surplus fuel.

4. In combination in fuel feed means, a main fuel tank, an injection pump, an auxiliary fuel tank above said main tank and said pump and connected to the latter, a feed pump having its intake connected to said main tank for withdrawing fuel therefrom, a supply pipe connected to the discharge of said feed pump and to said auxiliary tank for delivering fuel to the latter above the connection between said auxiliary tank and said injection pump, said supply pipe in part extending substantially horizontally from said auxiliary tank, a first fuel return pipe extending upward from the top of said horizontal portion of said supply pipe and thence downward to said main tank, visual fuel flow indicating means in said return pipe, and a second fuel return pipe connected to said auxiliary tank above the connection between the latter tank and said supply pipe and above the highest point of said first fuel return pipe, said second fuel return pipe being connected to said main tank for return thereto of surplus fuel.

FRANZ LANG.